(12) United States Patent
Irudayaraj et al.

(10) Patent No.: US 8,271,659 B2
(45) Date of Patent: Sep. 18, 2012

(54) METHODS AND SYSTEMS FOR AUTOMATIC REMOVAL AND REPLACEMENT OF CONNECTIONS IN A POOL RENDERED STALE BY A FIREWALL

(75) Inventors: Rajkumar Arockia Irudayaraj, Mountain View, CA (US); Stephen Mark Andrew Clark, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 544 days.

(21) Appl. No.: 12/204,538

(22) Filed: Sep. 4, 2008

(65) Prior Publication Data

US 2010/0058455 A1 Mar. 4, 2010

(51) Int. Cl.
*G06F 15/16* (2006.01)

(52) U.S. Cl. ......... 709/227; 709/226; 709/228; 709/229

(58) Field of Classification Search .................. 709/226, 709/227, 228, 229
See application file for complete search history.

(56) References Cited

U.S. PATENT DOCUMENTS

| | | | | |
|---|---|---|---|---|
| 6,799,202 B1 * | 9/2004 | Hankinson et al. | ............ | 709/219 |
| 6,823,515 B2 * | 11/2004 | LiVecchi | ...................... | 718/105 |
| 7,007,277 B2 * | 2/2006 | Hildebrand et al. | .......... | 718/104 |
| 7,233,991 B2 * | 6/2007 | Adhikari | ........................ | 709/224 |
| 2003/0140247 A1 * | 7/2003 | Marin et al. | .................... | 713/201 |
| 2004/0221031 A1 * | 11/2004 | Desai | ............................. | 709/224 |
| 2005/0038801 A1 * | 2/2005 | Colrain et al. | ................. | 707/100 |
| 2005/0039051 A1 * | 2/2005 | Erofeev | ......................... | 713/201 |
| 2006/0080435 A1 * | 4/2006 | Tankov et al. | ................. | 709/225 |
| 2006/0123079 A1 * | 6/2006 | Sturniolo et al. | ............. | 709/203 |
| 2006/0123479 A1 * | 6/2006 | Kumar et al. | .................... | 726/23 |
| 2006/0212361 A1 * | 9/2006 | Perkowski | ....................... | 705/26 |
| 2007/0073715 A1 * | 3/2007 | Tang | ................................ | 707/10 |
| 2007/0130572 A1 * | 6/2007 | Gilbert et al. | ................. | 719/318 |
| 2008/0228923 A1 * | 9/2008 | Chidambaran et al. | ........ | 709/227 |
| 2008/0250419 A1 * | 10/2008 | Kasten et al. | ................. | 718/104 |
| 2009/0030337 A1 * | 1/2009 | Gozani et al. | ................. | 600/554 |
| 2009/0064207 A1 * | 3/2009 | Sigal | ............................. | 719/330 |
| 2009/0089418 A1 * | 4/2009 | Saha et al. | ..................... | 709/224 |
| 2009/0089699 A1 * | 4/2009 | Saha et al. | ..................... | 715/771 |
| 2009/0132663 A1 * | 5/2009 | Kritt et al. | ..................... | 709/206 |
| 2009/0172094 A1 * | 7/2009 | Srivastava et al. | ............ | 709/203 |
| 2009/0172463 A1 * | 7/2009 | Gatev et al. | ....................... | 714/4 |
| 2009/0210485 A1 * | 8/2009 | Dunk | ............................. | 709/203 |
| 2009/0235348 A1 * | 9/2009 | Shu et al. | ........................ | 726/12 |
| 2010/0211816 A1 * | 8/2010 | Provo et al. | ........................ | 714/2 |

OTHER PUBLICATIONS

Tony Patton, "Take Advantage of ADO.NET Connection Pooling", Aug. 21, 2006, Tech Republic, pp. 1-4.*

* cited by examiner

*Primary Examiner* — Firmin Backer
*Assistant Examiner* — Jonathan Bui
(74) *Attorney, Agent, or Firm* — Kilpatrick Townsend & Stockton LLP

(57) ABSTRACT

This disclosure describes, generally, methods and systems for managing connections within a connection pool. The method includes initializing a plurality of connections. The plurality of connections are configured to pierce a firewall. The method further includes placing the plurality of connections in a connection pool, and storing creation times for each of the plurality of connections. The method then determines the firewall's connection teardown time period and, based at least in part on the firewall's connection teardown time period, setting the connection pool's connection teardown time period to be at least less than the firewall's connection teardown time period.

15 Claims, 5 Drawing Sheets

METHODS AND SYSTEMS FOR AUTOMATIC REMOVAL AND REPLACEMENT OF CONNECTIONS IN A POOL RENDERED STALE BY A FIREWALL

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to connection pools and, more particularly, to automatic removal and replacement of connections within a pool which are rendered stale (or unusable) by a firewall.

BACKGROUND

Presently, standard firewalls have preset connection teardown times. Basically, a timer is initiated when a network connection is started (or passed) and, when that timer "expires", the network connection is torn down (or closed). This teardown process occurs regardless of the current usage of the connection. For example, an application can be in the middle of transferring/receiving data through the connection and the firewall will still tear the connection down. Accordingly, this has a significant negative impact on any application or service using the connection at the time of the teardown.

The most common problem, particularly when using connection pools, is that a pool will allow stale connections (or soon to be stale connections) to be used by applications, since the connection pool is not aware that the firewall has torn down or will eminently teardown the connection(s). This results in unnecessary connection retries at the application layer, slower response times for applications, and may potentially result in failed transactions or web requests. Hence, there is a need for improved methods and systems in the art.

BRIEF SUMMARY

Embodiments of the present invention are directed to a method of managing connections within a connection pool. The method includes initializing a plurality of connections. The plurality of connections are configured to pierce a firewall. The method further includes placing the plurality of connections in a connection pool, and storing creation times for each of the plurality of connections. The method then determines the firewall's connection teardown time period and, based at least in part on the firewall's connection teardown time period, setting the connection pool's connection teardown time period to be at least less than the firewall's connection teardown time period.

According to further embodiments, a system for managing connections within a connection pool is described. The system includes a middle-tier application server including a connection pool generator and a memory. The connection pool generator is configured to initialize a plurality of connections. The plurality of connections are configured to pierce a firewall, place the plurality of connections in a connection pool, store creation times for each of the plurality of connections in the memory, determine the firewall's connection teardown time period, and, based at least in part on the firewall's connection teardown time period and the connection pool's connection teardown time period, to be at least less than the firewall's connection teardown time period. The system further includes a database server coupled with the middle-tier application server via the plurality of connections through the firewall. The database server is configured to respond to requests for data from the middle-tier application server. Alternatively, other server types may be used. For example, the connection pool may include connections such as, LDAP, IMAP, etc. Nonetheless, any connection type known to one skilled in the art may be used by aspects of the present invention.

In an alternative embodiment, a machine-readable medium is described. The machine-readable medium may include instructions for managing connections within a connection pool. The machine-readable medium includes instructions for initializing a plurality of connections. The plurality of connections are configured to pierce a firewall. The machine-readable medium further includes instructions for placing the plurality of connections in a connection pool and storing creation times for each of the plurality of connections. The machine-readable medium then includes instructions for determining the firewall's connection teardown time period and, based at least in part on the firewall's connection teardown time period, setting the connection pool's connection teardown time period to be at least less than the firewall's connection teardown time period.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to monitoring connection pools in order to automatically remove and replace connections within the pool which are made stale (or would shortly be made stale) by a firewall. Typically, a firewall has preset timeout parameters which dictate when a connection will be torn down. For example, a firewall may teardown any connection which has been open more than twelve hours. Accordingly, one embodiment of the present invention is configured to allow a connection pool to establish more stringent parameters to avoid the firewall forcing the teardown of connections. For example, the connection pool may teardown connections in the pool and replace them with new connections after only six hours. Therefore, connections loaned to/used by applications are ensured to be active and viable connections, and no stale connections will be allowed to be loaned out and/or used.

Figure 1:
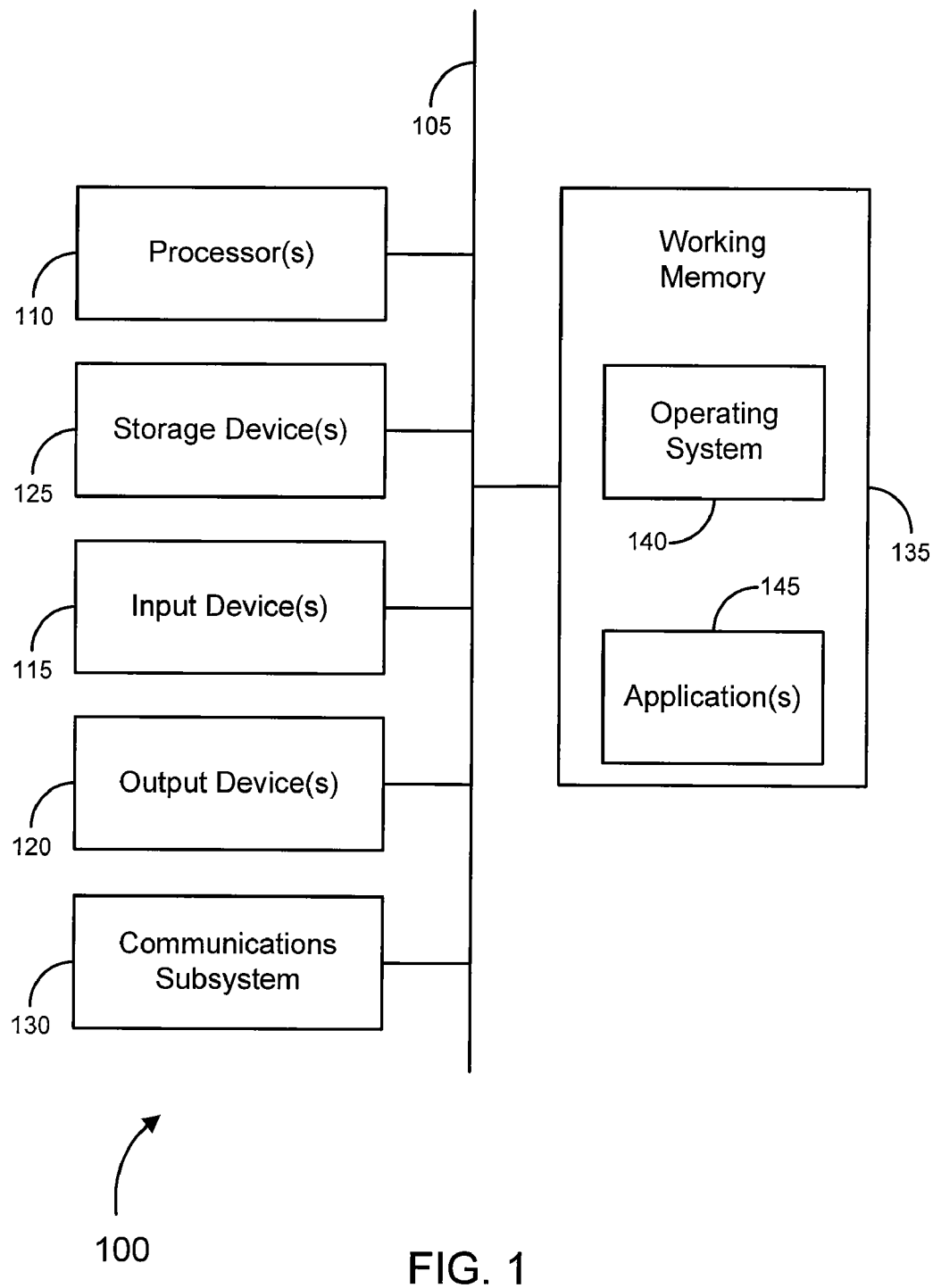
FIG. 1 is a generalized schematic diagram illustrating a computer system, in accordance with various embodiments of the invention.
Figure 5:
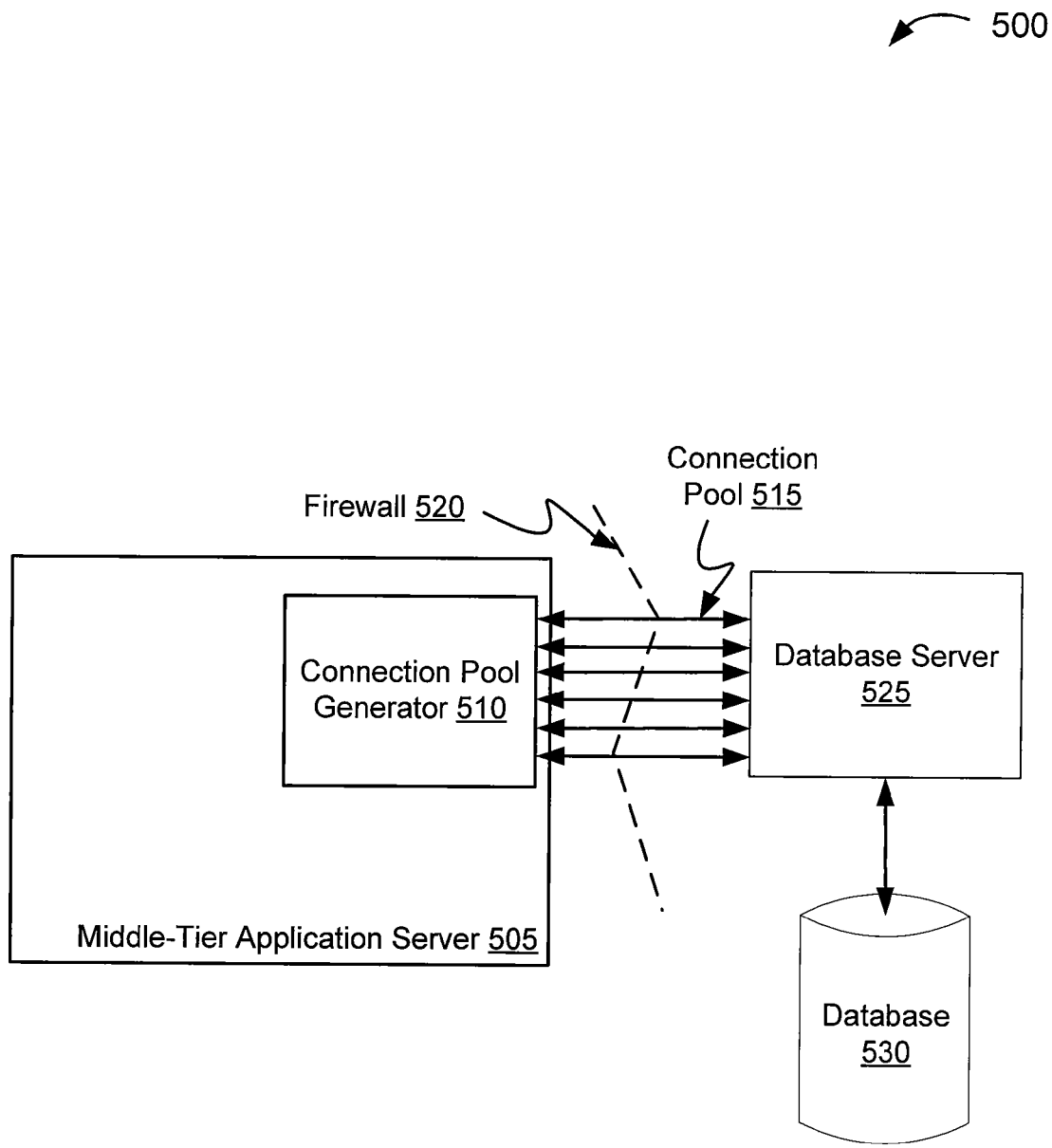
FIG. 5 is a block diagram illustrating a system for connection pool generation, maintenance, and teardown according to embodiments of the present invention.

FIG. 1 provides a schematic illustration of one embodiment of a computer system 100 that can perform the methods of the invention, as described herein, and/or can function, for example, as any part of middle-tier application server 505 or database server 520 in FIG. 5. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation one or more general-purpose processors and/or one or more special-purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 100 might also include a communications subsystem 130, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation dynamic memory, such as the working memory 135. Transmission media includes coaxial cables, copper wire and fiber optics, including the wires that comprise the bus 105, as well as the various components of the communication subsystem 130 (and/or the media by which the communications subsystem 130 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 105 retrieves and executes the instructions. The instructions received by the working memory 135 may optionally be stored on a storage device 125 either before or after execution by the processor(s) 110.

Figure 2:
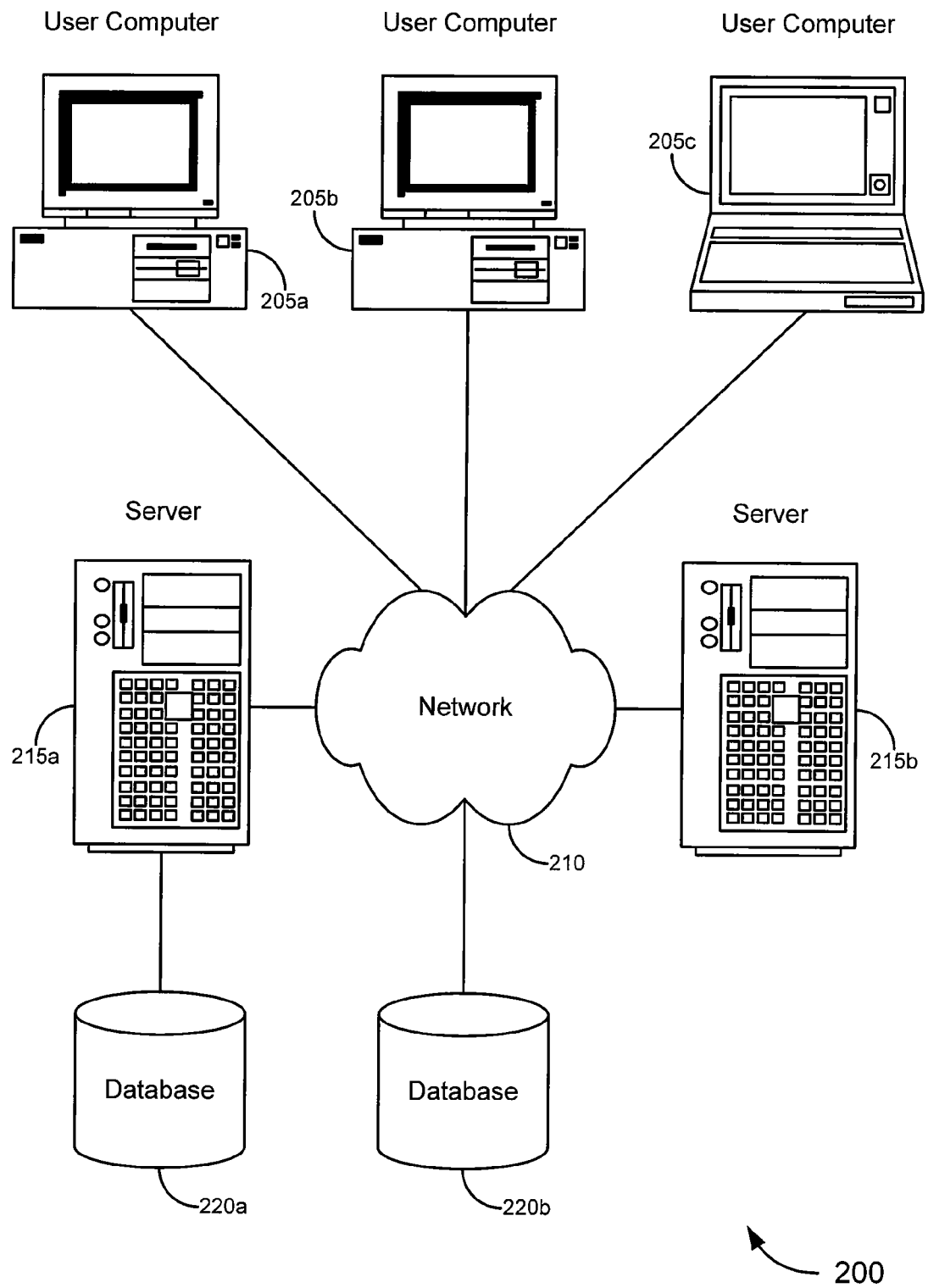
FIG. 2 is a block diagram illustrating a networked system of computers, which can be used in accordance with various embodiments of the invention.

A set of embodiments comprises systems for implementing staged configurator modeling. In one embodiment, user computers 205 and/or servers 215 may be implemented as computer system 100 in FIG. 1. Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents.

Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially-available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 205 and/or another server 215. In some embodiments, an application server can create web pages dynamically for displaying the information in accordance with embodiments of the invention, such as web pages displayed by middle-tier application server 505 in FIG. 5. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary: merely by way of example, a database 220a might reside on a storage medium local to (and/or resident in) a server 215a (and/or a user computer 205). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

Figure 3:
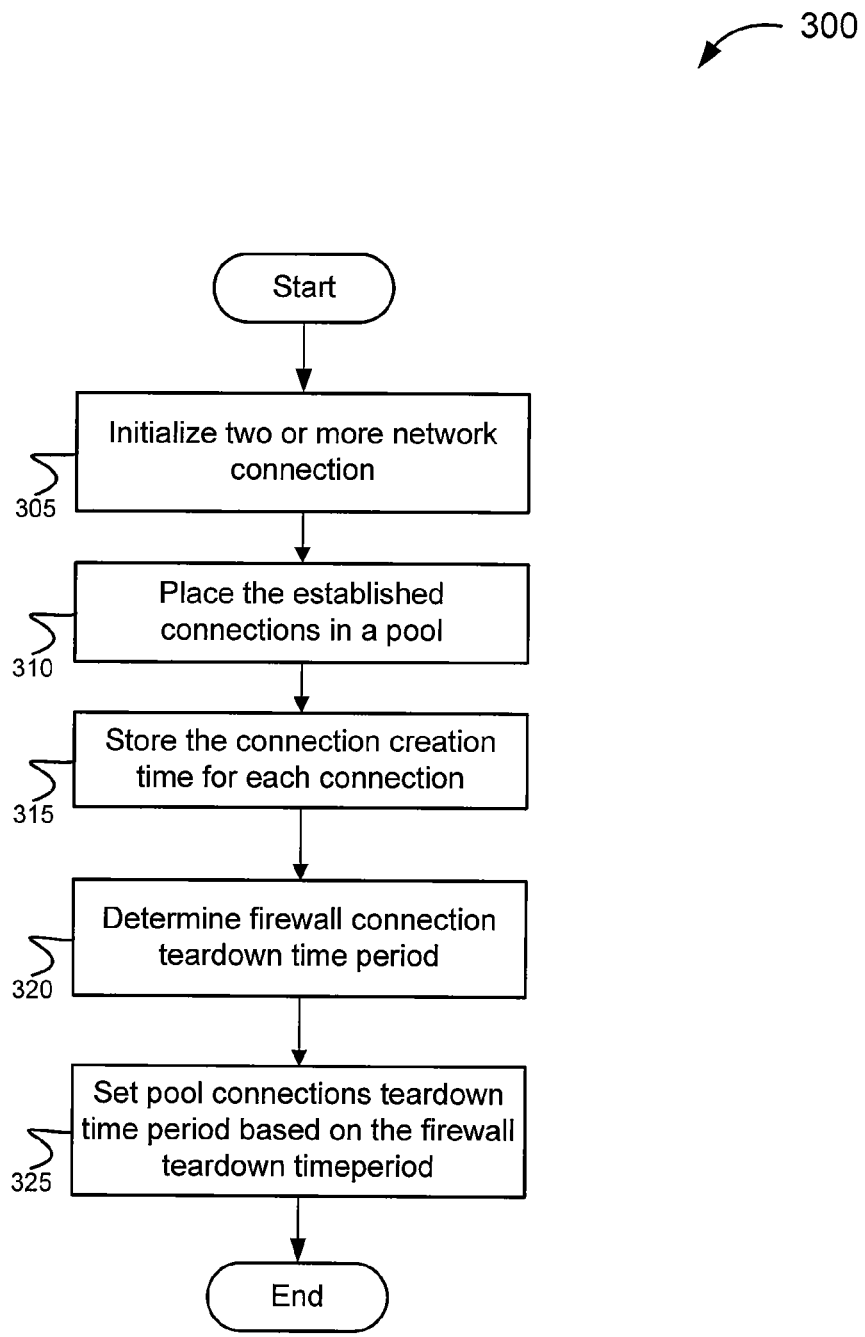
FIG. 3 is a flow diagram illustrating a method of connection pool generation and maintenance according to one embodiment of the present invention.

In one embodiment, server 215 or user computer 205 may be used to implement middle-tier application server 505 and database server 520 in FIG. 5. Turning now to FIG. 3, which illustrates a method 300 of generating and maintaining connection pools, according to one embodiment of the present invention. At process block 305, two or more network connections may be initialized. In one embodiment, the network connections may utilize Java™ Database Connectivity (JDBC) protocol. A connection utilizing the JDBC protocol allows applications to access and manage databases (e.g., send queries using SQL, process query results, update database content, etc.). The JDBC protocol utilizes an underlying transmission control protocol (TCP) connection and a database session object. Nonetheless, other protocols and connections may be used.

In one embodiment, the connection may be initialized asynchronously from the application operations. In other words, the connections can be created at separate times from when the applications may need to use the connections. Accordingly, the processing power and resources needed for initialization of the connections does not interfere with the processing and resource needs of the applications. Thus, the applications' performance can be further increased.

In a further embodiment, the initialized connections may be configured to pierce through a firewall. For example, a middle-tier application server may be executing an application(s) which needs to access data from a database(s) which is connected to a database server. However, a firewall is positioned between the middle-tier application server and the database server. Accordingly, in order to access the database, the middle-tier application server needs to pierce the firewall in order to access the database(s). As such, JDBC based connections may be generated to pierce the firewall. The overhead and/or setup cost for initializing such JDBC connections can be rather high, which can potentially slow down a user's experience when accessing data from the database(s). Hence, it is advantageous to maintain a "pool" of such connections in a connection pool.

At process block 310, the initialized connections may be placed in the connection pool. These connections remain in the pool at the ready for applications which require a connection thought the firewall to the database server in order to access the database(s). Accordingly, when an application requests a connection to the database server, the middle-tier application server accesses the connection pool and grants the application one of the connections. Due to the fact that the connections are being used to pierce the firewall, the firewall places certain restrictions on the connections. For example, the firewall may only allow a connection to remain open for a certain amount of time (e.g., 6 hours, 10 hours, 12 hours, etc.). As such, the connections within the connection pool should be monitored so that only active and valid connections are kept within the pool and given to requesting applications to use.

Accordingly, at process block 315, the creation time of each of the connections within the pool may be stored. The connection creation times may be stored in a table, a matrix, or other similar storage mechanism. Furthermore, the connection creation times may be stored locally at the middle-tier application server or may be stored remotely. Alternatively, the connection creation times may be stored in a volatile and/or a persistent memory location. In an alternative embodiment, the connections may be objects which include multiple attributes and one of the attributes may be the creation time of the object. This attribute may be accessed in order to determine the creation time of the connection. As such, for each connection initialized and placed in the connection pool, a creation time will be known.

At process block 320, the firewall's connection teardown time period may be determined. As mentioned before, a firewall typically has a preset time period in which the firewall will allow connections to remain open/active. After the preset time period expires, the firewall will teardown the connection. Unfortunately, the firewall indiscriminately tears down these connections regardless of if the connection is actively in use (this is done for security purposes in order to ensure that the firewall is not being compromised). As such, an application may be in the middle of utilizing the connection when the connection is torn down, which can cause errors, inconsistent application execution, slow response times for the application, etc.

Thus, in order to avoid such situations from occurring, the connection pool may be configured to set an automatic/preemptive teardown time for the connection within the connection pool which is more restrictive than the firewall's preset teardown time period (process block 325). For example, if the firewall's preset teardown time period is 12 hours, then the connection pool may set its teardown time to 6 hours. This conservative approach allows for the connection pool to stay one step ahead of the firewall by ensuring that the connections within the connection pool have are active, And have not been torn down by the firewall's preset teardown time period.

Figure 4:
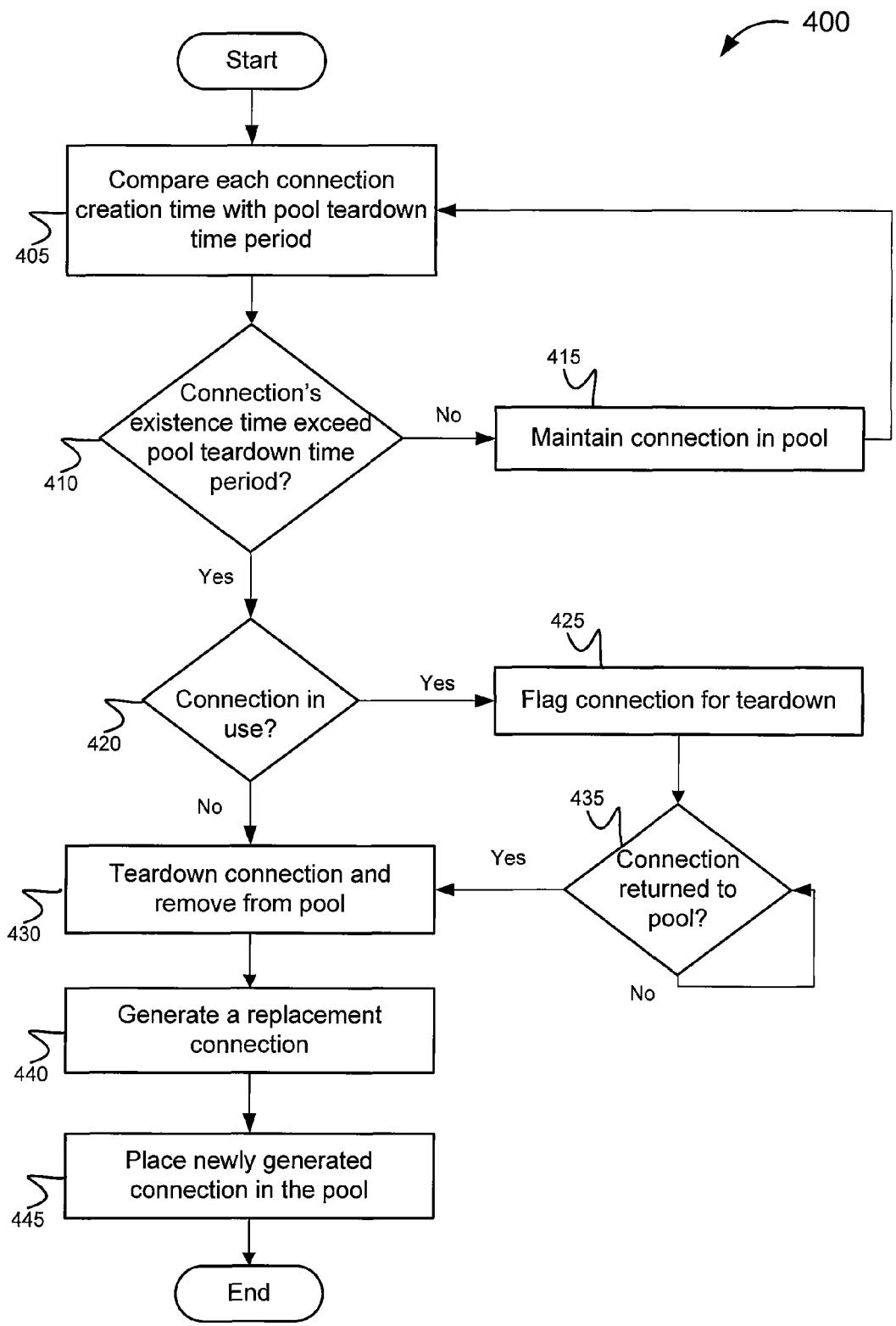
FIG. 4 is a flow diagram illustrating a method of connection teardown according to one embodiment of the present invention.

Turning now to FIG. 4, which illustrates a method 400 of connection teardown according to one embodiment of the present invention. At process block 405, the connection creation times of the connections within the connection pool may be compared with the connection pool's teardown time period. In one embodiment, the connection pool's connection teardown time period may be a property within the connection pool such as MaxConnectionReuseTime. As connections sit in the connection pool waiting to be used as well as connection from the pool already in use, the creation times from each of the connections may be monitored to determine if the connection should be torn down. This comparison and/or determination may be performed by an active thread (or task) running, for example, on the middle-tier application server. The thread may be set up to periodically (e.g., every 30 seconds) check the creation times of the connections against the connection pool's teardown time period.

As such, at decision block 410, it is determined whether any of the connections within the connection pool have exceeded the connection pool's teardown time period. If none of the connections have yet to exceed the teardown time period, then the connections are continued to be maintained within the pool (process block 415), and the connection creation times are continued to be checked. If, however, a connection has exceeded the connection pool's teardown time period, then a determination is made whether the connection is in use by an application (decision block 420).

If, at decision block 420, it is determined that the connection is not in use, then at process block 430, the connection is torn down and removed from the connection pool. However, if it is determined that the connection is in use and has exceeded the connection pool's teardown time period, then the connection is flagged with a teardown flag (process block 425). In one embodiment, the teardown flag may be a one bit switch which may be set to one or zero, one being true (set to teardown) and zero being false (not set to tear down). Nonetheless, other flagging conventions known in the art may be used.

Once a connection has been flagged to be torn down, at decision block 435 a determination is made whether the connection has been returned to the connection pool. This determination may be made in response to, for example, the JDBC connection.close API being called by the application. Hence, once the connection is no longer in use and has been returned to the connection pool, the connection may be torn down and removed from the connection pool (process block 430). At process block 440, for each connection torn down and removed from the connection pool, a replacement connection may be generated. Therefore, the quality of service (QoS) of the connection pool can be properly maintained by having the same number of connections within the pool at any given time.

Furthermore, at process block 445, the newly generated connections may be placed within the connection pool. Accordingly, method 400 allows for only active and valid connections to be maintained within the connection pool, and makes provisions for any connections not active or valid to be automatically and seamlessly torn down and removed from the pool and replaced with new connections.

Turning now to FIG. 5, which illustrates a system 500 for connection pool generation, maintenance, and teardown according to embodiments of the present invention. In one embodiment, system 500 may include a middle-tier application server 505. Middle-tier application server 505 may be configured to execute a variety of applications, enterprise applications, and/or services. Middle-tier application server 505 may include a connection pool generator 510.

In one embodiment, connection pool generator 510 may be configured to generate connection (as described above) to be placed in a connection pool 515. Further, connection pool generator 510 may be configured to manage the connections within connection pool 515. For example, as discussed above, connection pool generator 510 may set the connection pool's teardown time period after determining firewall 520's preset connection teardown time period. Connection pool generator 510 may also teardown connections within the connection pool which have exceeded the time period, flag stale connections for teardown that are in use, and generate and place new connections into the pool.

In one embodiment, an administrator, or equivalent operator, may be presented with an administration interface which allows various parameters for connection pool generator 510 to be set/altered. For example, the connection pool's teardown time period parameter may be set, the number of connections maintained within the connection pool, etc.

System 500 may further include a database server 525 connected with a database 530. In one embodiment, database server 525 may be separated from middle-tier application server 505 by firewall 520. Middle-tier application server 505 may require access to data stored in database 530, thus middle-tier application server 505 may be configured to access the data in database 530 by piercing through firewall 515 using connections in connection pool 515 and accessing database server 525.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computer implemented method of managing connections within a connection pool, the method comprising:
   initializing a plurality of connections, wherein the plurality of connections are configured to pierce a firewall;
   placing the plurality of connections in a connection pool;

storing creation times for each of the plurality of connections;

determining the firewall's connection teardown time period;

based at least in part on the firewall's connection teardown time period, setting the connection pool's connection teardown time period to be at least less than the firewall's connection teardown time period;

comparing each connection's creation time with the connection pool's teardown time period to determine if the connection has exceeded the connection pool's teardown time period;

in response to a connection's creation time exceeding the connection pool's teardown time period, removing the connection from the connection pool;

determining if the connection with the creation time exceeding the connection pool's teardown time period is in use;

in response to the connection being in use and while the connection is still in use, flagging the connection for removal after the connection is no longer in use;

generating a new replacement connection; and placing the new replacement connection in the connection pool.

2. The method of claim 1, further comprising removing flagged connections once the connections are no longer in use.

3. The method of claim 1, wherein the plurality of connections utilize Java database connectivity (JDBC) protocol.

4. The method of claim 3, wherein the JDBC protocol includes a combination of database sessions and underlying network connections.

5. The method of claim 1, wherein the initializing and placing steps are performed asynchronously.

6. The method of claim 1, wherein the plurality of connections comprise abstract objects.

7. The method of claim 6, wherein the abstract objects include a plurality of attributes.

8. The method of claim 7, wherein the plurality of attributes include a creation time attribute.

9. The method of claim 1, wherein the firewall's connection teardown time period is represented by a MaxConnectionReuseTime variable.

10. The method of claim 1, wherein quality of service (QoS) is maintained by keeping a consistent number of connections open in the connection pool at any given time interval.

11. A system for managing connections within a connection pool, the system comprising:

a middle-tier application server including a connection pool generator and a memory, the connection pool generator configured to initialize a plurality of connections, wherein the plurality of connections are configured to pierce a firewall, place the plurality of connections in a connection pool, store creation times for each of the plurality of connections in the memory, determine the firewall's connection teardown time period, based at least in part on the firewall's connection teardown time period, set the connection pool's connection teardown time period to be at least less than the firewall's connection teardown time period, compare each connection's creation time with the connection pool's teardown time period to determine if the connection has exceeded the connection pool's teardown time period, determine if the connection with the creation time exceeding the connection pool's teardown time period is in use, and in response to the connection being in use and while the connection is still in use, flag the connection for removal after the connection is no longer in use, generate a new replacement connection, and place the new replacement connection in the connection pool; and a database server coupled with the middle-tier application server via the plurality of connections through the firewall, the database server configured to respond to requests for data from the middle-tier application server.

12. The system of claim 11, wherein the connection pool generator is further configured in response to a connection's creation time exceeding the connection pool's teardown time period, to remove the connection from the connection pool, generate a new replacement connection, and place the new replacement connection in the connection pool.

13. The system of claim 11, further comprising a database coupled with the database server.

14. A non-transitory machine-readable medium for managing connections within a connection pool, having sets of instructions stored thereon which, when executed by a machine, cause the machine to:

initialize a plurality of connections, wherein the plurality of connections are configured to pierce a firewall;

place the plurality of connections in a connection pool;

store creation times for each of the plurality of connections;

determine the firewall's connection teardown time period; and based at least in part on the firewall's connection teardown time period, set the connection pool's connection teardown time period to be at least less than the firewall's connection teardown time period;

compare each connection's creation time with the connection pool's teardown time period to determine if the connection has exceeded the connection pool's teardown time period;

determine if the connection with the creation time exceeding the connection pool's teardown time period is in use;

in response to the connection being in use and while the connection is still in use, flag the connection for removal after the connection is no longer in use;

generating a new replacement connection; and placing the new replacement connection in the connection pool.

15. The non-transitory machine-readable medium of claim 14, wherein the sets of instructions which, when further executed by the machine, further cause the machine to:

in response to a connection's creation time exceeding the connection pool's teardown time period, remove the connection from the connection pool.

* * * * *